(12) United States Patent
Huang et al.

(10) Patent No.: US 11,346,804 B2
(45) Date of Patent: May 31, 2022

(54) MICROFABRICATED ELECTROCHEMICAL GAS SENSOR

(71) Applicants: Yue Huang, East Lansing, MI (US); Stanley Zuo, Danville, IL (US)

(72) Inventors: Yue Huang, East Lansing, MI (US); Stanley Zuo, Danville, IL (US)

(73) Assignee: LabSys LLC, East Lansing, MI (US)

( * ) Notice: Subject to any disclaimer, the term of this patent is extended or adjusted under 35 U.S.C. 154(b) by 214 days.

(21) Appl. No.: 16/794,226

(22) Filed: Feb. 19, 2020

(65) Prior Publication Data

US 2021/0255136 A1    Aug. 19, 2021

(51) Int. Cl.
*G01N 27/404*    (2006.01)
*G01N 27/413*    (2006.01)

(52) U.S. Cl.
CPC ......... *G01N 27/413* (2013.01); *G01N 27/404* (2013.01)

(58) Field of Classification Search
CPC .................. G01N 27/404; G01N 27/4045
See application file for complete search history.

(56) References Cited

U.S. PATENT DOCUMENTS 5,437,999 A * 8/1995 Diebold ................ C12Q 1/001
                                                  204/403.11
7,481,912 B2 * 1/2009 Stelzle ............... G01N 27/3278
                                                  204/242

FOREIGN PATENT DOCUMENTS

JP          05-203612 A  *  8/1993

OTHER PUBLICATIONS

English language translation of the Description section Japanese application, H03-127938, from which JP 05-203612 was published on Aug. 10, 1993 (Year: 1993).*

* cited by examiner

*Primary Examiner* — Alexander S Noguerola

(57) ABSTRACT

This invention describes an electrochemical gas sensor that utilizes microfabrication to achieve miniaturization without using a membrane. The sensor is comprised of thin film electrodes and insulators, and micro cavities in them. The micro cavities are filled with a liquid electrolyte that is kept in the micro cavities by surface tension.

16 Claims, 3 Drawing Sheets

MICROFABRICATED ELECTROCHEMICAL GAS SENSOR

BACKGROUND OF THE INVENTION

The invention relates to electrochemical gas sensors, more particularly, to miniaturization of electrochemical gas sensors using microfabrication techniques.

Electrochemical gas sensors measure the concentration of a target gas by recording the Faradic current of the gas molecules at an electrode surface. Electrochemical gas sensors outperform many other types of sensors in sensitivity, selectivity, response time and power consumption. The conventional electrochemical gas sensors are normally constructed with a stack of working electrodes, a reference electrode and an auxiliary/counter electrode soaking in liquid electrolyte all sealed in a container. A through-container cavity and a gas permeable membrane next to the cavity within the container allows gas to pass while keeping the electrolyte within the container. Conventional electrochemical gas sensors are disadvantageous in portable applications due to their larger size, higher cost, and low manufacturability. Although electrodes can be miniaturized through microfabrication, incorporating conventional electrolytes and membranes into a microfabrication process is challenging. Replacing ordinary electrolyte with non-volatile ionic liquids may eliminate the use of ordinary membranes, but the low diffusion coefficient of a gas in ionic liquid may result in a high sensor response time. To reduce the response time, microfabricated porous thin film electrode can be coated with a thin layer of ionic liquid electrolyte, reducing the mass transport path. However, retaining liquid electrolytes within a microfabricated electrochemical cell remains a challenge.

BRIEF SUMMARY OF THE INVENTION

This invention describes an electrochemical gas sensor that utilizes microfabrication to achieve miniaturization. In accordance with an embodiment of the present disclosure, micro cavities penetrating through a stack of conductor and insulator layers are filled with a liquid electrolyte. The electrolyte exhibits low contact angle over the electrodes and high contact angle when in contact with the surface of the outer insulator. Thus, the liquid electrolyte is kept in the micro cavities by surface tension.

DETAILED DESCRIPTION OF THE INVENTION

Figure 1:
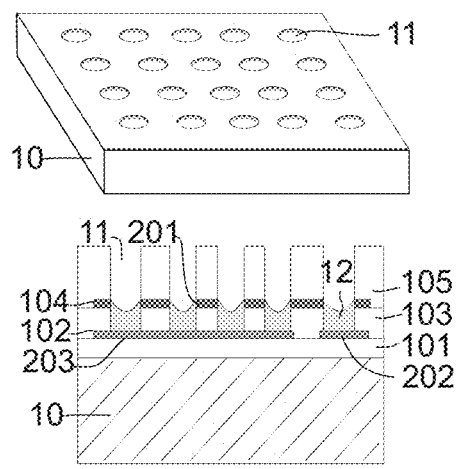
FIG. 1 is a perspective view and a cross-section view a preferred exemplary embodiment of the present invention, a microfabricated electrochemical gas sensor comprising two conductor layers.

In a preferred embodiment shown in FIG. 1, a plurality of micro cavities is formed in a stack of thin film layers comprising two sets of conductor and insulator layer pairs on top of a substrate 10 insulated with a dielectric layer 101. From bottom up, the first layer pair consists of the bottom conductor layer 102 and an intermediate insulator layer 103. A seconded layer set is a top conductor layer 104 and the top insulator layer 105 as an outer insulator. The micro cavities 11 penetrate the top insulator layer 105 all the way through to the bottom conductor layer 102, exposing the sides of the top insulator layer 105, the top conductor layer 104, the intermediate insulator layer 103, and the top surface of the bottom conductor layer 102. A working electrode 201 is produced from the top conductor layer 104, and a reference electrode 202 and a counter electrode 203 is produced from the bottom conductor layer 102. A liquid electrolyte 12 partially fills the micro cavities 11, wetting the counter electrode 203 and the reference electrode 202, the intermediate insulator layer 103, and the working electrode 201 from bottom up, bringing all electrodes in contact to form an electrochemical cell. However, the electrolyte does not wet the outer insulator, the top insulator layer 105 in this exemplary embodiment.

Figure 2:
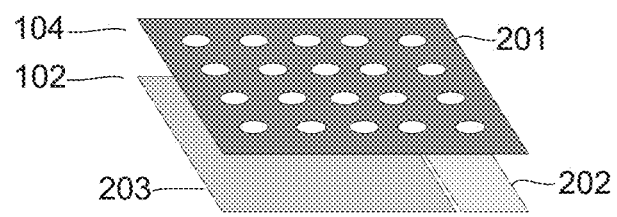
FIG. 2 is a perspective view of an exemplary electrode arrangement scheme of the preferred exemplary embodiment.

In accordance with this preferred embodiment, FIG. 2 illustrates an exemplary electrode arrangement scheme, wherein the working electrode 201 is formed by the top conductor layer 104, and the reference electrode 202 and the counter electrode 203 are each formed by a portion of the bottom conductor layer 102.

In accordance with this preferred embodiment, the exemplary gas sensor can be configured to detect a single gas through the choice of electrode materials, electrolyte, and a bias potential. An exemplary sulfur dioxide sensor can be configured with a gold working electrode 201, a platinum reference electrode 202, a platinum counter electrode 203, 1-butyl-3-methylimidazolium bis(trifluoromethylsulfonyl) imide (BMIM NTF2) ionic liquid electrolyte, and 0V bias potential.

Figure 3:
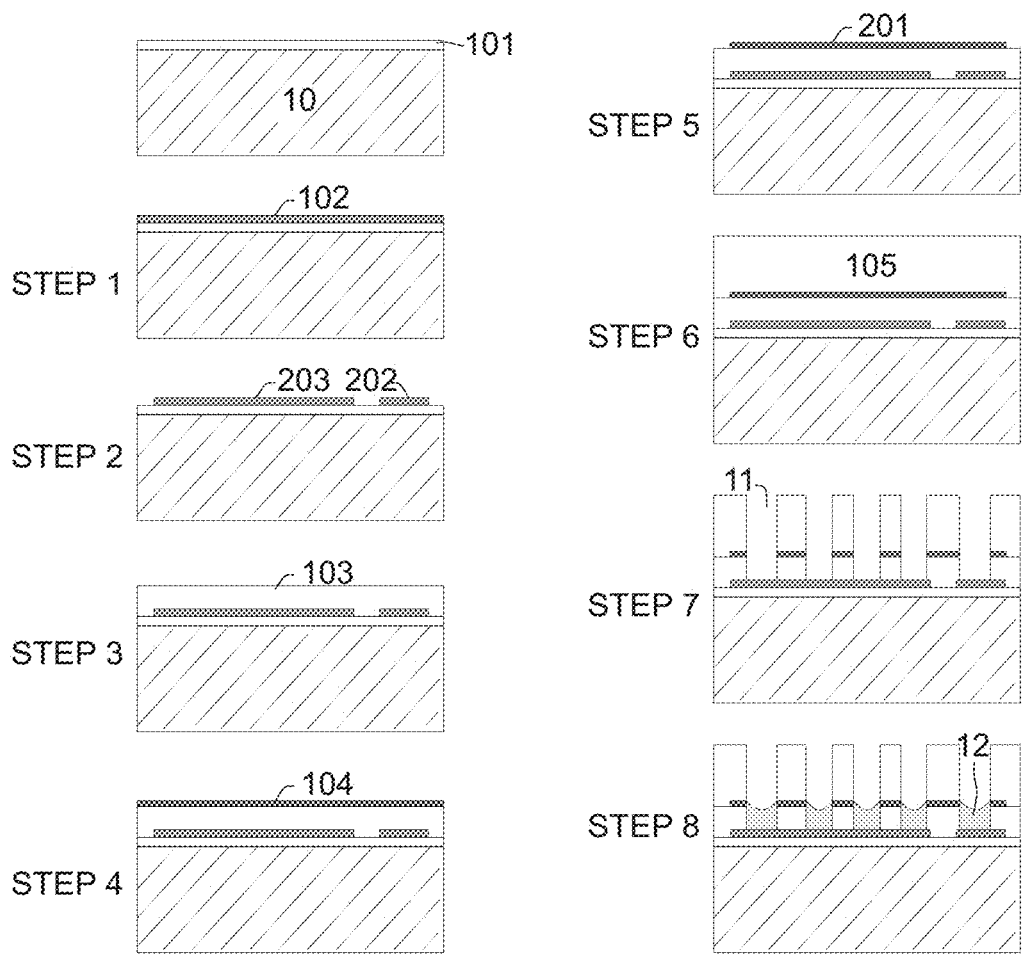
FIG. 3 is an exemplary microfabrication process flow for producing the preferred exemplary embodiment.

In accordance this preferred embodiment, an exemplary fabrication process is illustrated in FIG. 3. The process starts with an insulated substrate. In STEP 1, the bottom conductor layer 102, platinum (Pt) for example, is deposited on a silicon substrate 10 with an oxide layer 101. STEP 2 uses photolithography and etching to pattern the conductor layer 102 to define the areas of the reference electrode 202, the counter electrode 203, including any pad, lead or interconnect to the electrodes. In STEP 3 the patterned conductor layer 102 is coated with the insulator layer 103. In STEP 4 the top conductor layer 104 is deposited over the intermediate insulator layer 103. STEP 5 patterns 104 with photolithography and etching to define the working electrode 201 and any pad, lead or interconnect to 201. STEP 6 caps the patterned top conductor 104 with the insulator layer 105. STEP 7 forms the micro cavities by anisotropic etching through the layers 105, 104 and 103 and stopping on the bottom conductor layer 102. The micro cavities may be interconnected internally by further isotropic etching to partially remove 103 between neighboring micro cavities, increasing the volume for containing electrolyte, without enlarging the size of the openings. STEP 7 also exposes the pads connected with the electrodes. STEP 8 fills the micro cavities with liquid electrolyte.

Referring to the exemplary fabrication process illustrated in FIG. 3 in more details, the layer 102 and 104 may contain sublayers of different conductor materials, such as titanium adhesion layers. A conductor layer or a sublayer may be chosen from, but is not limited to, silver (Ag), Gold (Au), nickel, palladium, rhodium, iridium, indium tin oxide, carbon, conductive polymers, nanoparticles or other conductor or semiconductor materials. The surface of a conductor layer or a sublayer can be modified with materials other than the conductor material, such as carbon nanotubes or Ag. The surface of a conductor or modified conductor can be transformed into a compound of said conductor or modified surface. For example, the exemplary reference electrode 202 surface can be modified by electroplating Ag on Pt, and then partially converting Ag to AgCl by chlorinating Ag to produce an Ag/AgCl reference electrode.

Referring to the exemplary fabrication process illustrated in FIG. 3 in further details, the insulator layer 101, 103 and 105 may contain sublayers of different insulator materials or material of the same kind but processed under different conditions. For example, silicon dioxide films with different residue stress prepared under different frequencies with a plasma enhanced chemical vapor deposition tool. The surface of the top insulator layer 105 can be modified to reduce the wettability of the electrolyte, so that the liquid electrolyte has large contact angle with the surface, and can be kept inside the cavity by surface tension.

Referring to the preferred embodiment, in FIG. 1, the overall size of a sensor is about a couple of millimeters in X- or Y-dimension. Preferably, the diameter and depth of the micro cavities are in the scale of micrometers or even smaller.

Figure 4:
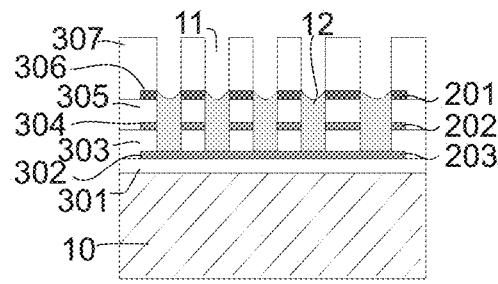
FIG. 4 is a cross-section view of an exemplary embodiment with three conductor layers and micro cavities that bottom on the bottom conductor layer.

In a further exemplary embodiment shown in FIG. 4, a cross-section view shows a stack of three sets of conductor and insulator layers on top of an insulator layer 301 on substrate 10, a bottom conductor layer 302 and an intermediate insulator layer 303, an intermediate conductor layer 304 and another intermediate insulator layer 305, a top conductor layer 306 and a top insulator layer 307. The micro cavities 11 penetrate through the outer insulator 307 and stop on the bottom conductor 302. The top conductor layer 306 serves as the working electrode 201. As in the preferred embodiment, a reference electrode and a counter electrode can be produced with a portion of a lower conductor layer. Alternatively, as shown in FIG. 4, the conductor layers 302 can serve as the counter electrode and the conductor layer 304 can serve as the reference electrode. The benefits of dedicating a conductor layer to a reference electrode include reducing the process complexity when a reference electrode material other than the counter electrode or the working electrode is needed.

In a broad embodiment that comprising multiple conductor layers, there are one or more working electrodes, reference electrodes or a counter electrode. Each electrode is formed by one or more conductor layers. A working electrode is produced with one or more upper conductor layers. A counter electrode is produced with one or more lower conductor layers. A reference electrode is produced with one or more intermediate conductor layers. Or, a portion of one or more intermediate or lower conductor layers serves as a reference electrode, and the remaining portion serves as a counter electrode.

Figure 5:
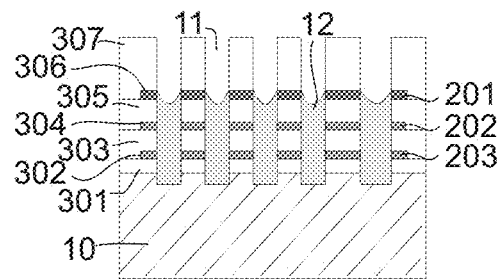
FIG. 5 is a cross-section view of an exemplary embodiment with three conductor layers and the micro cavities penetrating into the substrate.

In a further exemplary embodiment in FIG. 5, the micro cavities 11 penetrate through the bottom conductor layer 302 and the insulator layer 301 underneath, into the substrate 10. The benefits of deeper penetration include creating cavities of larger volume for containing more electrolyte.

Figure 6:
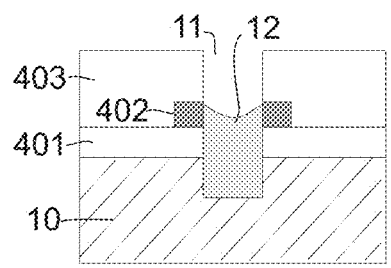
FIG. 6 is a cross-section view of an exemplary embodiment with one conductor layer and one micro cavity penetrating into the substrate.
Figure 7:
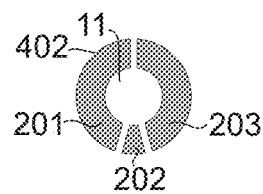
FIG. 7 is an exemplary electrode arrangement scheme of the exemplary embodiment with one conductor layer and one micro cavity.

In a further exemplary embodiment in FIG. 6, an electrochemical gas sensor is produced with a single micro cavity 11 in a thin film layer stack comprising one conductor layer 402 and one insulator layer 403 on top of the insulator layer 401. The conductor layer 402 is portioned into a working electrode 201, a reference electrode 202 and a counter electrode 203, shown in FIG. 7.

In all exemplary embodiments above, the insulated substrate is a dielectric material such as quartz or sapphire, or a substrate with a dielectric coating such as a silicon wafer with a thermal oxide layer grown on its surface.

In all exemplary embodiments above, an insulator layer or a sublayer of it is produced with a group of selected dielectric or semiconductor material comprising, but not limited to silicon dioxide, silicon nitride, amorphous silicon, polyimide and parylene. The exposed surface of an outer insulator layer or its sublayer can be modified so that the liquid electrolyte has large contact angle with. For instance, modification with molecules that can bind perfluorinated terminations, such as henicosyl-1,1,2,2-tetrahydrododecyldimethyltris(dimethylaminosilane). Other than modification with a material, the surface structure or morphology can be modified to produced high contact angle. For instance, chemically heterogeneous surfaces, or a pillar surface. The modified surface can result in lowering the surface energy, and high liquid electrolyte contact angle.

In all exemplary embodiments above, the applicable liquid electrolyte 12 comprising salt, sulfuric acid, ionic liquid, or a mixture of them in liquid. The liquid can be transformed into a gel form.

In all exemplary embodiments above, the liquid electrolyte 12 in a micro cavity 11 has low contact angle with the exposed surface of an electrode, but high contact angle with that of an outer insulator layer, i.e., the top insulator layer. A contact angle is measured through the liquid, where a liquid-vapor interface meets a solid surface. A high contact angle means a low wettability of the surface, such as an angle larger than 30 degrees. A low contact angle means a good wettability of the surface, such as an angle smaller than 10 degrees. When the mass of a droplet in a micro cavity is small enough and the surface area of a micro cavity is large enough, the surface tension is larger than the gravity and normal acceleration force experienced by the droplet, so that the liquid electrolyte 12 can be held within the micro cavity by surface tension without the need a membrane to prevent the liquid from leakage.

The exemplary embodiments described herein are intended to be exemplary only. The person with the ordinary skill in the art will understand and appreciate the existence of variations, combinations, and equivalents of the specific exemplary embodiments. The invention should therefore not to be limited by these specific exemplary embodiments, but by all exemplary embodiments and intended methods used within the scope of this invention.

What is claimed:

1. An electrochemical gas sensor microfabricated on an insulated substrate, comprising:
   a thin film stack of conductor and insulator layers on said insulated substrate, comprising one or more conductor layers and an insulator layer in between said conductor layers, and a top insulator layer on top of a top conductor layer; and said conductor layers are divided into one or more portions so that there are in total three or more separated individual portions of conductors in said thin film stack layers; and one or more upper conductor layer or upper conductor layers, is or are selected as a working electrode or working electrodes; and one or more lower conductor layer or lower conductor layers, is or are selected as a reference electrode or reference electrodes; and one or more unselected lower conductor layer or unselected lower conductor layers, is or are selected as a counter electrode or counter electrodes; and one or more micro-cavities are formed penetrating through said thin film stack layers into said insulated substrate, wherein said one or more micro-cavities are injected with a liquid or gel electrolyte to submerge said micro-cavities up to said top conductor layer so that each of the conductor and insulator layers in said thin film stack layers is in contact with said electrolyte by a ring of exposed surface, but said liquid or gel electrolyte does not extend over the top of said top insulator layer.

2. Said sensor of claim 1, wherein said insulated substrate is an insulator selected from a group of materials comprising silicon, glass, quartz, polymer, and sapphire.

3. Said sensor of claim 1, wherein said insulated substrate is any substrate coated with an insulator layer selected from a group of dielectric materials comprising silicon dioxide, silicon nitride, polyimide, and parylene.

4. Said sensor of claim 1, wherein said conductor layers are selected from a group of conducting materials comprising titanium, gold, platinum, silver, carbon, palladium, rhodium, indium tin oxide, nickel, iridium, conductive polymers, and semiconductor materials.

5. Said sensor of claim 1, wherein said ring of exposed surface of each said conductor layers is modified to be coated with an alternative conductor different from itself, said alternative conductor is selected from a group of conducting materials comprising titanium, gold, platinum, silver, carbon, palladium, rhodium, indium tin oxide, nickel, iridium, conductive polymers, and semiconductor materials.

6. Said sensor of claim 1, wherein said ring of exposed surface of each said conductor layers is modified to be coated by a compound chemical thereof.

7. Said sensor of claim 1, wherein said ring of exposed surface of said top insulator layer is treated so that the contained liquid electrolyte in said micro-cavities can form a substantial large contact angle to said surface.

8. Said sensor of claim 1, wherein said liquid or gel electrolyte is comprised of salt, acid, ionic liquid, or a mixture thereof.

9. An electrochemical gas sensor microfabricated on an insulated substrate, comprising:

a thin film stack of conductor and insulator layers on said insulated substrate, comprising two or more conductor layers and an insulator layer in between said conductor layers, and a top insulator layer on top of a top conductor layer; and said conductor layers are divided into one or more portions so that there are in total three or more separated individual portions of conductors in said thin film stack layers; and one or more upper conductor layer or upper conductor layers, is or are selected as a working electrode or working electrodes; and one or more lower conductor layer or lower conductor layers, is or are selected as a reference electrode or reference electrodes; and one or more unselected lower conductor layer or unselected lower conductor layers, is or are selected as a counter electrode or counter electrodes; and one or more micro-cavities are formed with a bottom conductor layer penetrating up through the rest of said thin film stack layers, wherein said one or more micro-cavities are injected with a liquid or gel electrolyte to submerge said micro-cavities up to said top conductor layer so that each of the conductor and insulator layers in said thin film stack layers is in contact with said electrolyte by a ring of exposed surface, but said liquid or gel electrolyte does not extend over the top of said top insulator layer.

10. Said sensor of claim 9, wherein said insulated substrate is an insulator selected from a group of materials comprising silicon, glass, quartz, polymer, and sapphire.

11. Said sensor of claim 9, wherein said insulated substrate is any substrate coated with an insulator layer selected from a group of dielectric materials comprising silicon dioxide, silicon nitride, polyimide, and parylene.

12. Said sensor of claim 9, wherein said conductor layers are selected from a group of conducting materials comprising titanium, gold, platinum, silver, carbon, palladium, rhodium, indium tin oxide, nickel, iridium, conductive polymers, and semiconductor materials.

13. Said sensor of claim 9, wherein said ring of exposed surface of each said conductor layers is modified to be coated with an alternative conductor different from itself, said alternative conductor is selected from a group of conducting materials comprising titanium, gold, platinum, silver, carbon, palladium, rhodium, indium tin oxide, nickel, iridium, conductive polymers, and semiconductor materials.

14. Said sensor of claim 9, wherein said ring of exposed surface of each said conductor layers is modified to be coated by a compound chemical thereof.

15. Said sensor of claim 9, wherein said ring of exposed surface of said top insulator layer is treated so that the contained liquid electrolyte in said micro-cavities can form a substantial large contact angle to said surface.

16. Said sensor of claim 9, wherein said liquid or gel electrolyte is comprised of salt, acid, ionic liquid, or a mixture thereof.

* * * * *